US006487639B1

(12) United States Patent
Lipasti

(10) Patent No.: US 6,487,639 B1
(45) Date of Patent: Nov. 26, 2002

(54) DATA CACHE MISS LOOKASIDE BUFFER AND METHOD THEREOF

(75) Inventor: Mikko Herman Lipasti, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/232,262

(22) Filed: Jan. 19, 1999

(51) Int. Cl.⁷ .............................................. G06F 12/00
(52) U.S. Cl. ........................................ 711/137; 711/119
(58) Field of Search ................................ 711/118, 119, 711/137, 146; 712/205, 207

(56) References Cited

U.S. PATENT DOCUMENTS

| 5,305,389 | A | * | 4/1994 | Palmer | 382/305 |
| 5,752,069 | A | * | 5/1998 | Roberts et al. | 711/128 |
| 5,761,725 | A | * | 6/1998 | Zeller et al. | 711/146 |
| 5,790,823 | A | * | 8/1998 | Puzak et al. | 712/205 |
| 5,802,588 | A | * | 9/1998 | Ramagopal et al. | 711/118 |
| 6,073,230 | A | * | 6/2000 | Pickett et al. | 712/205 |

OTHER PUBLICATIONS

Brad Calder et al., "Value Profiling", *The Proceedings of Micro–30*, (Dec. 1–3, 1997), in Research Triangle Park, North Carolina, IEEE Service center, (11 pages).

Freedy Gabbay et al., "Can Program Profiling Support value Production?", *The Proceedings of Micro–30*, (Dec. 1, 3, 1997), in Research Triangle Park, North Carolina, IEEE Service Center, (12 pages).

Mikko H. Lipasti et al., "Value Locality and Load Value Prediction", *ASPLOS*, VII, ACM, Inc. (Oct. 1996), pp. 138–147.

Mikko H. Lipasti et al. "Exceeding the Dataflow Limit via Value Prediction", IEEE Publication No. 1072–4451/96, (1996), pp. 226–237.

Yiannakis Sazeides et al. "The Prdictability of Data Values", *The Proceedings of Micro–30*, Dec. 1–3, 1997), in Research Triangle Park, North Carolina, IEEE Service Center, (12 pages).

Kai Wang et al. "Highly Accurate Data Value Prediction using Hybrid Predictors", *The Proceedings of Micro '97*, Dec. 1–3, 1997, in Research Triangle Park, North Carolina, IEEE Service Center, (11 pages).

* cited by examiner

*Primary Examiner*—Matthew Kim
*Assistant Examiner*—Matthew D. Anderson
(74) *Attorney, Agent, or Firm*—Wood Herron & Evans

(57) ABSTRACT

A data processing system, circuit arrangement, integrated circuit device, program product, and method implement value prediction in a data cache miss lookaside buffer that maintains predicted values only for load instructions that miss a data cache. As a result, whenever a load instruction misses a cache, the predicted value therefor may be retrieved from the buffer concurrently with servicing of the cache miss so that subsequent instructions can be speculatively executed while the actual value is retrieved. By limiting the buffer to storing only predicted values for load instructions that miss the data cache, the size of the buffer can be reduced compared to conventional designs, thereby providing more effective value prediction for a given size of buffer.

25 Claims, 4 Drawing Sheets

DATA CACHE MISS LOOKASIDE BUFFER AND METHOD THEREOF

FIELD OF THE INVENTION

The invention is generally related to data processing systems and processors therefor, and in particular to retrieval of data from a data cache in a multi-level memory architecture.

BACKGROUND OF THE INVENTION

Computer technology continues to advance at a remarkable pace, with numerous improvements being made to the performance of both microprocessors—the "brains" of a computer—and the memory that stores the information processed by a computer.

In general, a microprocessor operates by executing a sequence of instructions that form a computer program. The instructions are typically stored in a memory system having a plurality of storage locations identified by unique memory addresses. The memory addresses collectively define a "memory address space," representing the addressable range of memory addresses that can be accessed by a microprocessor.

Both the instructions forming a computer program and the data operated upon by those instructions are often stored in a memory system and retrieved as necessary by the microprocessor when executing the computer program. The speed of microprocessors, however, has increased relative to that of memory devices to the extent that retrieving instructions and data from a memory can often become a significant bottleneck on performance. To decrease this bottleneck, it is desirable to use the fastest available memory devices possible. However, both memory speed and memory capacity are typically directly related to cost, and as a result, many computer designs must balance memory speed and capacity with cost.

A predominant manner of obtaining such a balance is to use multiple "levels" of memories in a memory architecture to attempt to decrease costs with minimal impact on system performance. Often, a computer relies on a relatively large, slow and inexpensive mass storage system such as a hard disk drive or other external storage device, an intermediate main memory that uses dynamic random access memory devices (DRAM's) or other volatile memory storage devices, and one or more high speed, limited capacity cache memories, or caches, implemented with static random access memory devices (SRAM's) or the like. In some instances, instructions and data are stored in separate instruction and data cache memories to permit instructions and data to be accessed in parallel. One or more memory controllers are then used to swap the information from segments of memory addresses, often known as "cache lines", between the various memory levels to attempt to maximize the frequency that requested memory addresses are stored in the fastest cache memory accessible by the microprocessor. Whenever a memory access request attempts to access a memory address that is not cached in a cache memory, a "cache miss" occurs. As a result of a cache miss, the cache line for a memory address typically must be retrieved from a relatively slow, lower level memory, often with a significant performance penalty.

Data cache misses in particular have been found to significantly limit processor performance. In some designs, for example, it has been found that over 25% of a microprocessor's time is spent waiting for data cache misses to complete. Therefore, any mechanism that can reduce the frequency and/or latency of data cache misses can have a significant impact on overall performance.

One conventional approach for reducing the impact of data cache misses is to increase the size of the data cache to in effect reduce the frequency of misses. However, increasing the size of a data cache can add significant cost. Furthermore, oftentimes the size of the data cache is limited by the amount of space available on an integrated circuit device. Particularly when the data cache is integrated onto the same integrated circuit device as a microprocessor to improve performance, the amount of space available for the data cache is significantly restricted.

Other conventional approaches include decreasing the miss rate by increasing the associativity of a cache, and/or using cache indexing to reduce conflicts. While each approach can reduce the frequency of data cache misses, however, each approach still incurs an often substantial performance hit whenever data cache misses occur.

Yet another conventional approach for reducing the impact of data cache misses incorporates value prediction to attempt to predict what data will be returned in response to a data cache miss prior to actual receipt of such data. In particular, it has been found that the result of practically any instruction can be predicted approximately 50% of the time based upon the result of the last execution of the instruction.

To implement value prediction, it has been proposed to store the result of each instruction in a lookup table after the instruction is executed. The result would be indexed by the memory address of the instruction. Subsequently, whenever the same instruction was executed again, the lookup table would be accessed to attempt to locate the result at the same time that the data cache was accessed. If the data cache access missed, the predicted result would be used, and subsequent instructions would be executed speculatively using the predicted result while the data cache miss was processed. Then, when the data in the data cache was returned, it would be compared to the predicted result to verify the prediction. If the prediction was correct, a performance benefit would be obtained since the subsequent instructions were executed sooner than would otherwise occur if the processor waited for the data from the data cache to be returned. On the other hand, if the prediction was incorrect, the processor would need to be "rolled back" to essentially undo the results of the speculatively-executed instructions. Assuming a relatively reliable prediction, however, the benefits of prediction would exceed the penalties of misprediction, resulting in an overall performance improvement.

One problem associated with proposed value prediction implementations is that a relatively large lookup table would be required to achieve a significant performance improvement. Specifically, with proposed implementations, predicted values are stored for either all static instructions or all static load instructions. However, it has been found that most commercial workloads have a relatively large instruction working sets—that is, a relatively large number of instructions are typically executed before any particular instruction is repeated. Since value prediction relies on the results from previous executions of instructions, a lookup table would need to be relatively large to ensure that predicted data was available on a relatively frequent basis.

However, given that space on a processor integrated circuit device is often at a premium, it is often desirable to minimize the space occupied by all components on the device, including any lookup tables. Consequently, the size of a value prediction lookup table is often constrained, which by necessity limits its effectiveness. Increasing the size of a lookup table often increases costs and/or requires other compromises to be made in other areas of a processor design. Therefore, a need still exists in the art for improving the effectiveness of value prediction in a more compact and cost effective manner.

SUMMARY OF THE INVENTION

The invention addresses these and other problems associated with the prior art by providing a data processing system, circuit arrangement, integrated circuit device, program product, and method that implement value prediction in a data cache miss lookaside buffer that maintains predicted values only for load instructions that miss the data cache. It has been found that a large proportion of data cache misses, e.g., as many as 80–90% or more, are caused by a relatively few number of instructions. Moreover, it has been found that the predictability of load instructions that miss a data cache is often greater than other instructions. As a result of both of these factors, limiting value prediction to load instructions that miss the data cache enables significantly more effective value prediction for a given size buffer or lookup table.

A circuit arrangement consistent with the invention includes a control circuit and a buffer coupled to an execution circuit. The execution circuit processes a load instruction by initiating retrieval of a value requested by the load instruction from a memory having a cache. The buffer stores a predicted value for the load instruction, and a control circuit provides the predicted value to the execution circuit when retrieval of the value requested by the load instruction misses the cache.

One method for executing instructions in a computer consistent with the invention includes determining whether a value requested by a load instruction being executed is stored in a cache, and in response to determining that the value is not stored in the cache, predicting the value requested by the load instruction. Another method for executing instructions in a computer consistent with the invention includes storing a value requested by a load instruction in response to a cache miss for the value, and retrieving the value during a subsequent execution of the load instruction.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

The illustrated implementations of the invention generally utilize a data cache miss lookaside buffer to predict the values returned by load instructions that miss a data cache. A predicted value is retrieved for a load instruction only when the load instruction misses the data cache, and in some implementations, only after a confidence threshold has been exceeded for the predicted value. Predicted values may be stored in the data cache miss lookaside buffer either dynamically or statically. In a dynamic implementation, the actual value retrieved for a missed load instruction is typically stored as the predicted value for that instruction for use in subsequent misses for the same load instruction. In a static implementation, the predicted value is generated prior to runtime, e.g., during compilation or profiling of a computer program, whereby the predicted value typically does not change during runtime. Moreover, even the predicted values generated prior to runtime may be used in a dynamic environment, e.g., to load initial values that are subsequently updated during runtime.

Figure 1:
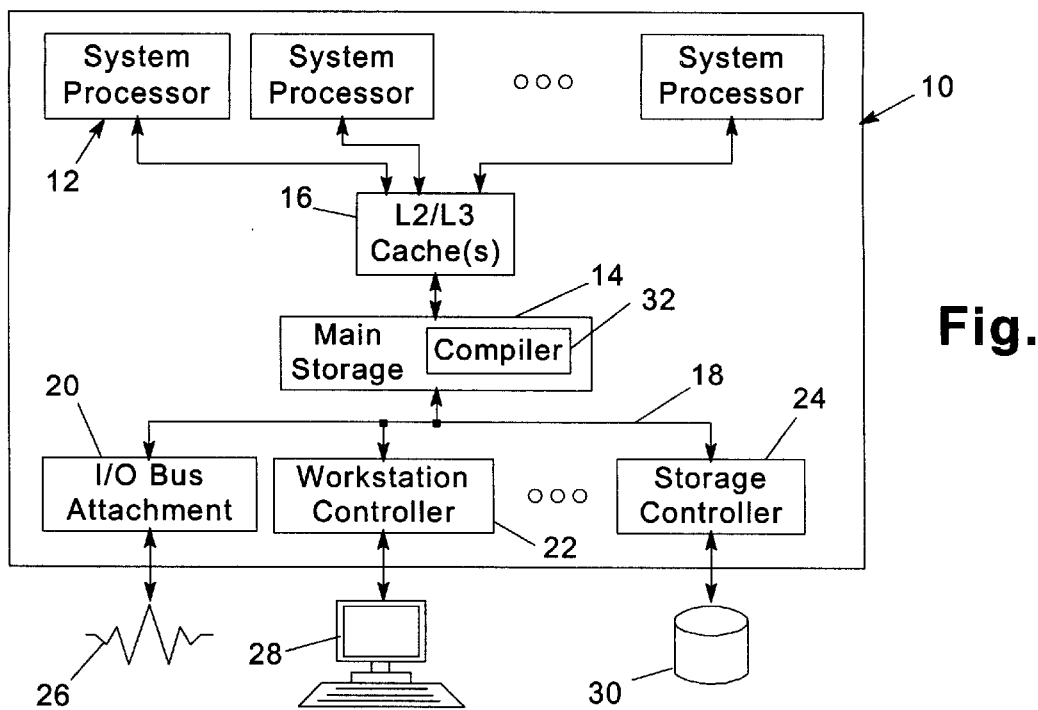
FIG. 1 is a block diagram of a data processing system consistent with the invention.

Turning to the Drawings, wherein like numbers denote like parts throughout the several views, FIG. 1 illustrates the general configuration of an exemplary data processing system 10 suitable for value prediction consistent with the invention. System 10 generically represents, for example, any of a number of multi-user computer systems such as a network server, a midrange computer, a mainframe computer, etc. However, it should be appreciated that the invention may be implemented in other data processing systems, e.g., in stand-alone or single-user computer systems such as workstations, desktop computers, portable computers, and the like, or in other computing devices such as embedded controllers and the like. One suitable implementation of data processing system 10 is in a midrange computer such as the AS/400 computer available from International Business Machines Corporation.

Data processing system 10 generally includes one or more system processors 12 coupled to a memory subsystem including main storage 14, e.g., a non-volatile memory storage such as an array of dynamic random access memory (DRAM). Also illustrated as interposed between processors 12 and main storage 14 is a cache system 16, typically including one or more levels of data, instruction and/or combination caches, with certain caches either serving individual processors or multiple processors as is well known in the art. Moreover, as will be discussed below, each processor 12 also typically includes at least one level of dedicated cache memory. Furthermore, main storage 14 is coupled to a number of types of external devices via a system bus 18 and a plurality of interface devices, e.g., an input/output bus attachment interface 20, a workstation controller 22 and a storage controller 24, which respectively provide external access to one or more external networks 26, one or more workstations 28, and/or one or more storage devices such as a direct access storage device (DASD) 30.

It should be appreciated that data processing system 10 is merely representative of one suitable environment for use with the invention, and that the invention may be utilized in a multitude of other environments in the alternative. The invention should therefore not be limited to the particular implementations discussed herein.

Value prediction consistent with the invention is typically implemented in a circuit arrangement on a system processor or other programmable integrated circuit device, and it should be appreciated that a wide variety of programmable devices may utilize value prediction consistent with the invention. Moreover, as is well known in the art, integrated circuit devices are typically designed and fabricated using one or more computer data files, referred to herein as hardware definition programs, that define the layout of the circuit arrangements on the devices. The programs are typically generated by a design tool and are subsequently used during manufacturing to create the layout masks that define the circuit arrangements applied to a semiconductor wafer. Typically, the programs are provided in a predefined format using a hardware definition language (HDL) such as VHDL, verilog, EDIF, etc. While the invention has and hereinafter will be described in the context of circuit arrangements implemented in fully functioning integrated circuit devices and data processing systems utilizing such devices, those skilled in the art will appreciate that circuit arrangements consistent with the invention are capable of being distributed as program products in a variety of forms, and that the invention applies equally regardless of the particular type of signal bearing media used to actually carry out the distribution. Examples of signal bearing media include but are not limited to recordable type media such as volatile and non-volatile memory devices, floppy disks, hard disk drives, CD-ROM's, and DVD's, among others and transmission type media such as digital and analog communications links.

As will also be discussed in greater detail below, value prediction consistent with the invention may also rely on predicted values that are generated prior to runtime, e.g., by a compiler computer program 32 illustrated as resident in main storage 14. All or part of the program code implementing compiler 32 may be resident from time to time in other components in data processing system 10, e.g., within any of the caches in cache system 16, within DASD 30, and/or within any of system processors 12, among others.

Figure 2:
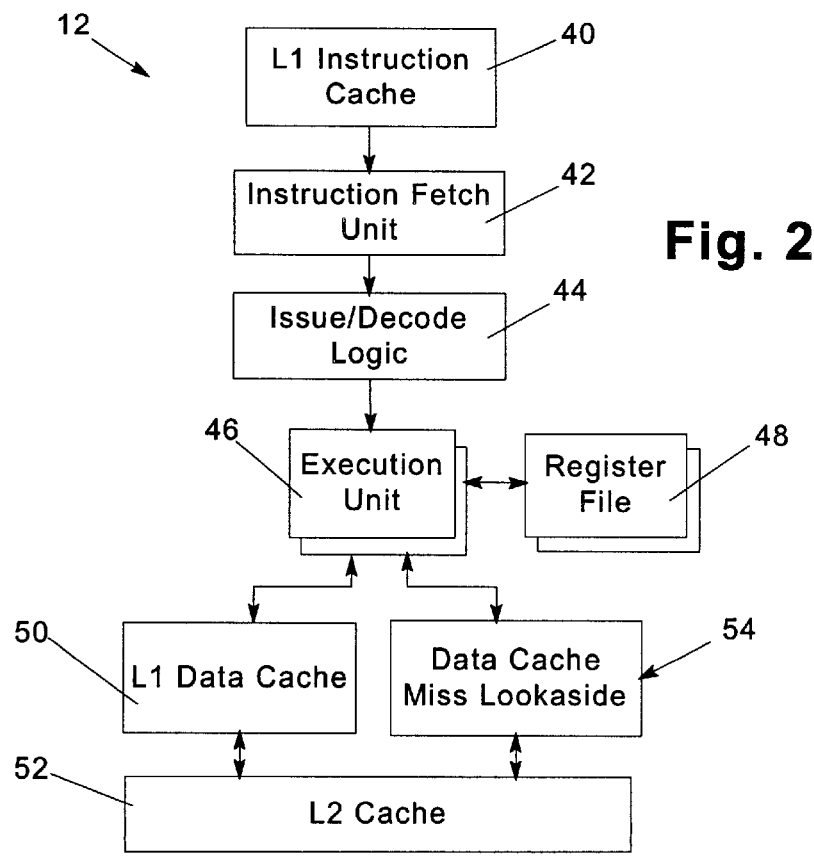
FIG. 2 is a block diagram of one of the system processors in the data processing system of FIG. 1.

FIG. 2 illustrates several relevant components of one of the system processors 12 of FIG. 1. Specifically, FIG. 2 illustrates an L1 instruction cache 40 that provides instructions to an instruction fetch unit 42. Fetched instructions are passed to an issue/decode logic block 44, which in turn passes the instructions to one or more execution units 46 in the manner well understood in the art. Each Execution unit 46 typically includes one or more pipelines that permit multiple instructions to be operated upon in different stages of execution at one time. Execution of instructions by each execution unit 46 manipulates registers stored in one or more register files 48. Moreover, each execution unit has access to data stored in an L1 data cache 50, as well as an L2 cache 52 that provides data and/or instructions not initially stored in the L1 data or instruction caches. Typically, the L1 data and instruction caches are located on-board system processor 12. Moreover, L2 cache 52 may also be located on-board system processor 12, or in the alternative, the controller for the cache may be disposed on the same integrated circuit device as the system processor, with the actual memory storage disposed on a separate integrated circuit device. Moreover, in other implementations, such secondary caching may be wholly disposed external to the system processor.

To implement value prediction consistent with the invention, a data cache miss lookaside circuit arrangement 54 also interfaces with the set of execution units 46 and L2 cache 52. Circuit arrangement 54 is illustrated as operating in parallel with L1 data cache 50, as it is typically during processing of an access to the L1 data cache that the data cache miss lookaside circuit operates to potentially provide predicted values in the event of a miss on the L1 data cache.

Figure 3:
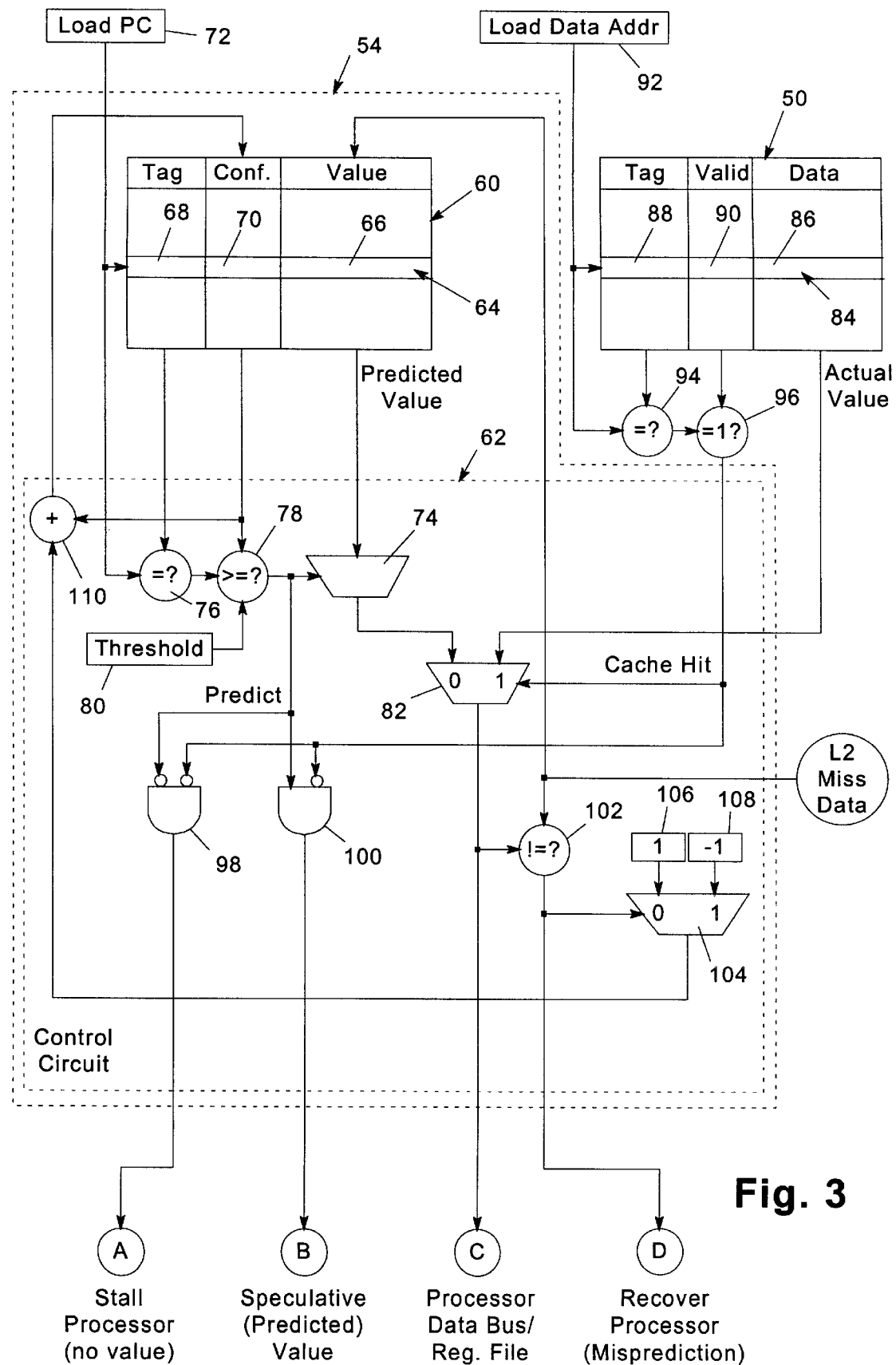
FIG. 3 is a block diagram of the data cache miss lookaside circuit arrangement of FIG. 2.

FIG. 3 illustrates one suitable implementation of data cache miss lookaside circuit arrangement 54, including a buffer 60 under the control of a control circuit 62. Buffer 60 is implemented as a table including a plurality of entries 64. Each entry 64 is indexed by a hash index derived from the memory address of the load instruction associated with the entry. The entry includes a predicted value stored in a field 66, as well as a tag field 68 and a confidence indicator field 70. Tag field 68 typically includes all or part of the memory address of the specific load instruction for the entry. When a particular load instruction at a particular memory address is accessed, table 60 is accessed via a load program counter (PC) 72 to index an entry within the table. The tag value is then compared to the program counter to determine whether the entry in fact matches the current memory address stored in the program counter.

The confidence indicator 70 is implemented as a value that is selectively incremented or decremented based upon whether the last prediction associated with the entry was correct. The confidence indicator may be as small as one bit, or more desirably may specify a range of values so that a predicted value will not be used until sufficient confidence has been built up over time. In the alternative, a confidence indicator may be omitted, with each predicted value used in each instance when the program counter matches an entry in the data cache miss lookaside buffer.

Buffer 60 is typically implemented in SRAM memory, and may be integrated into L1 data cache 50 in some implementations. Other manners of implementing memory storage for predicted values may also be used in the alternative.

The predicted value stored in field 66 for the currently-indexed entry 64 in buffer 60 is provided to a buffer 74 that is selectively enabled in response to two comparisons made in blocks 76 and 78. Block 76 compares the current value stored in the load program counter 72 with the tag field 68 of the currently-indexed entry. If these values match, indicating that the entry corresponds to the current memory address, an enable signal is provided to block 78. Block 78 then performs a greater than or equal to comparison between the value stored in the confidence indicator field 70 of the currently-indexed entry 64 and a threshold value stored in a register 80. Thus, an enabling signal, hereinafter referred to as a "predict" signal, is provided to enable buffer 74 to output the predicted value from the current-indexed entry in buffer 60 whenever (1) the memory address for the instruction associated with the entry equals the current program counter, and (2) the minimum confidence threshold is met or exceeded. It should be appreciated that the threshold value may be hardwired to a preset value, or may be stored in a programmable register to permit varying degrees of confidence to trigger the use of value prediction.

The predicted value output from buffer 74 is provided to a two-way multiplexer 82, which is gated by a cache hit signal output from the L1 data cache 50.

Cache 50 is illustrated as utilizing a plurality of entries 84, each including a data field 86 storing a specific cache line of memory, as well as a tag field 88 and a valid indicator field 90 that indicates whether the current cache line holds valid data. Typically, fields 88 and 90 form the directory portion of the cache which may be stored separate from the actual cache line data. Cache 50 is indexed by the load data address register 92, which indicates the current data address being accessed by the current load instruction executed by the processor. The cache line 86 stored in a currently-indexed entry in the L1 data cache is used to provide an actual value to the second input of multiplexer 82, representing the actual value returned in response to the L1 data cache access.

Both the tag and valid fields 88, 90 of the currently-indexed entry or cache line are provided to a pair of comparison blocks 94, 96 to generate the cache hit signal that is used to gate multiplexer 82. Comparison block 94 compares the tag with the value output by load data address register 92, and comparison block 96 compares the valid field 90 in the currently-index entry to 1 to determine whether or not the current entry has valid data stored therein. Thus, whenever the tag field matches the current value in register 92, and the valid field indicates that valid data is stored in the entry, the access is determined to have hit the L1 data cache, and as a result, the actual value output from field 86 of the currently-indexed entry 84 is provided as the output of multiplexer 82. Otherwise, if a cache miss occurs, the predicted value is output from multiplexer 82 instead.

Both the predict signal output from comparison block 78, and the cache hit signal output from comparison block 96, are provided to a pair of logic gates 98, 100 for use in controlling the operation of the processor in response to whether (1) predicted data is available for the current instruction, and (2) the current instruction has hit the L1 data cache. Block 98 is implemented as an AND gate having two active-low inputs and an active-high output. The output of logic gate 98 is thus asserted whenever (1) no predicted data is available for the current instruction, and (2) the access to the L1 data cache as a result of the instruction has missed the cache. This signal is output on the line labeled "A" and is used to stall the processor to suspend the current instruction, as well as all dependent instructions in the system processor until the cache miss completes. It should be appreciated that stalling a processor to wait for completion of a cache miss is well known in the art, and thus, need not be discussed further herein.

Logic gate 100 is implemented as an AND gate with an active-high input and an active-low input. The active-high input is coupled to the predict line output from comparison block 78, while the active-low input is couple to the cache hit line output from comparison block 96. The output of logic gate 100, represented by a line "B" is asserted whenever (1) predicted data is available, and (2) a cache miss has occurred on the L1 data cache. The purpose of this signal is to prevent completion of the load instruction until the miss completes so that the results of the prediction can be verified. It is to be noted, however, that dependent instructions executing subsequent to the load instruction are not stalled in this instance, and are allowed to proceed as far as permitted until the load is complete.

The output of multiplexer 82 is provided on a line labeled "C", and represents the actual or predicted output that is provided to the processor data bus/register files for use by dependent instructions that are being executed speculatively in response to the load instruction. The output of multiplexer 82 is also provided to a comparison block 102 which compares the value output by the multiplexer with the data received from the L2 cache in response to the L1 data cache miss. It is in block 102 that the results of the prediction are verified. As a result, if block 102 determines that the actual and predicted results do not match, a recover processor signal, output on a line labeled "D" in FIG. 3, is asserted to notify the processor that a misprediction has occurred, and that the state of the processor should be rolled back to undo the results of the speculatively-executed dependent instructions. It should be appreciated that rolling back the state of a processor in response to misprediction is well known in the art, and need not be discussed further herein.

The data provided by the L2 cache in response to an L1 data cache miss is also provided to buffer 60 to update the value of the currently-indexed entry 64 in the buffer. In the implementation illustrated in FIG. 3, the actual data returned from the L2 cache is always stored back into the corresponding entry in the buffer in response to the miss data being returned by the L2 cache. Since this update data is provided only in response to an L1 data cache miss, an entry is created or updated in the buffer only in response to an L1 data cache miss.

In alternative embodiments, it may be desirable to include logic circuitry between the L2 cache and buffer 60 to further gate when the value is updated, e.g., so that the value is updated only when a misprediction has occurred. Also, it may be desirable to gate the updating of the predicted value using the confidence level in the entry, e.g., so that an entry that was a high confidence is less likely to be updated given its prior success.

The output of comparison block 102 is also provided to gate the output of a multiplexer 104 that is coupled to receive inputs from a pair of constant registers 106, 108. Register 106 stores a +1 value and register 108 stores a −1 value, and it is based upon the results of the prediction whether a +1 or −1 value is output from multiplexer 104. This output is provided to an adder 110 that combines the +1 or −1 value with the current confidence indicator 70 for the currently-indexed entry 64 in buffer 60. This summed value is then stored back into the entry to update the confidence level therefor. Multiplexer 104, registers 106, 108 and adder 110 thus operate effectively as an up/down confidence level counter. As a result, whenever a valid prediction has occurred, the confidence level is incremented in the entry, and whenever a misprediction occurs, that value is decremented. It should be appreciated, however, that a multitude of other manners of tracking a confidence level for predicted data may also be used in the alternative. For example, a saturating up/down counter could be used to adjust a confidence level for a particular entry.

Figure 4:
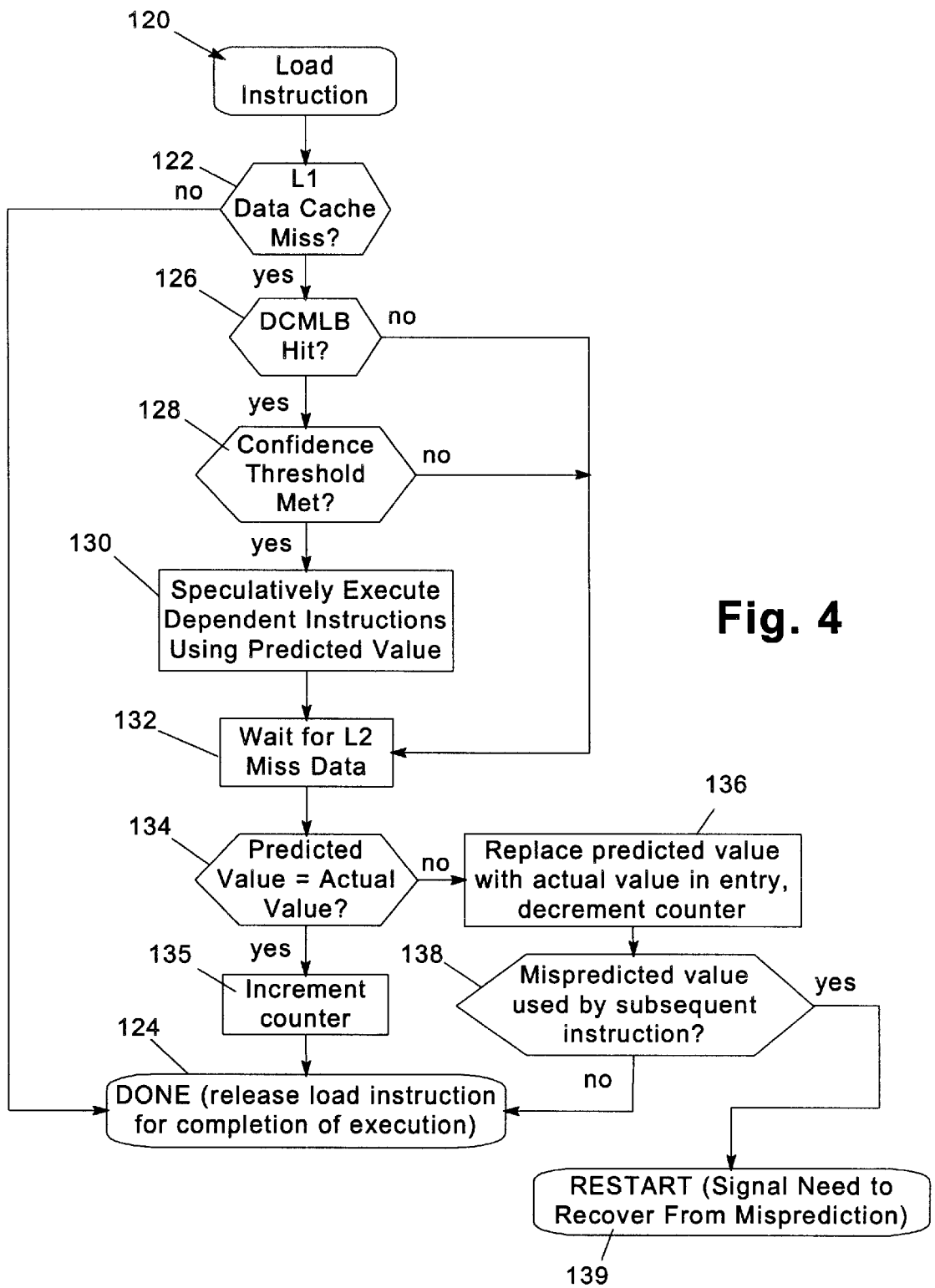
FIG. 4 is a flowchart illustrating the sequence of operations performed during execution of a load instruction by the system processor of FIG. 2.

FIG. 4 illustrates in another way the basic program flow that occurs in response to a load instruction executed by a system processor 12. As shown at 120, a load instruction is processed beginning in block 122 by determining whether an L1 data cache miss has occurred. If not, no value prediction is required, and as such the load can be handled by the L1 data cache in a conventional manner. Specifically, as illustrated at 124, the load instruction is released for completion of execution, completing processing of the instruction.

If an L1 data cache miss does occur, as shown at block 126, it is determined whether the data cache miss lookaside buffer has hit the instruction—that is, whether predicted data is stored in the buffer for the load instruction being processed. If the buffer is hit, the confidence indicator for the entry in the data cache miss lookaside buffer is compared with the confidence threshold in block 128 to determine whether the minimum confidence threshold has been met. If the confidence level meets the minimum threshold, dependent instructions are speculatively executed using the predicted value output from the buffer, as shown at block 130.

Next, as shown at block 132, the load instruction, and all speculatively-executed dependent instructions, must wait for the L2 missed data to be returned from the L2 cache. Also, returning to blocks 126 and 128, if either the data cache miss lookaside buffer was missed, or the confidence level was not met, speculative execution in block 130 is bypassed, and the load instruction waits for the L2 missed data to be returned from the L2 cache, as shown at block 132.

Next, based upon the L2 miss data, it is determined in block 134 whether the predicted value was correct—that is, whether the predicted value was equal to the actual value returned by the L2 cache. If so, the prediction was successful, and the confidence level counter (and thus the confidence level of the predicted value) is incremented (block 135). Then, as illustrated in block 124, the load instruction is released and execution thereof is completed.

Returning to block 134, if the predicted value does not match the actual value, the mispredicted value is replaced in the buffer entry and the confidence level counter is decremented to lower the confidence level for the current entry in block 136. Next, it is determined in block 138 whether the mispredicted value was used by a subsequent instruction. If so, the processor must be rolled back to undo the results of any such instruction. This is handled by signaling a need to recover from this prediction to the processor to cause a restart, as represented at block 139. Processing of the load instruction is then complete. Returning to block 138, if the mispredicted value was not used, processor rollback in block 139 is bypassed, and processing of the load instruction is complete.

Handling of misprediction may occur in any of a number of known manners. For example, the pipeline in an execution unit may be flushed in the manner typically used to flush a pipeline in response to a mispredicted branch prediction operation. In addition, misprediction may be handled by re-executing each dependent instruction, without re-fetching such instructions. Another manner of rolling back the state of a processor is to only re-execute data dependent instructions, rather than all speculatively-executed instructions.

Figure 5:
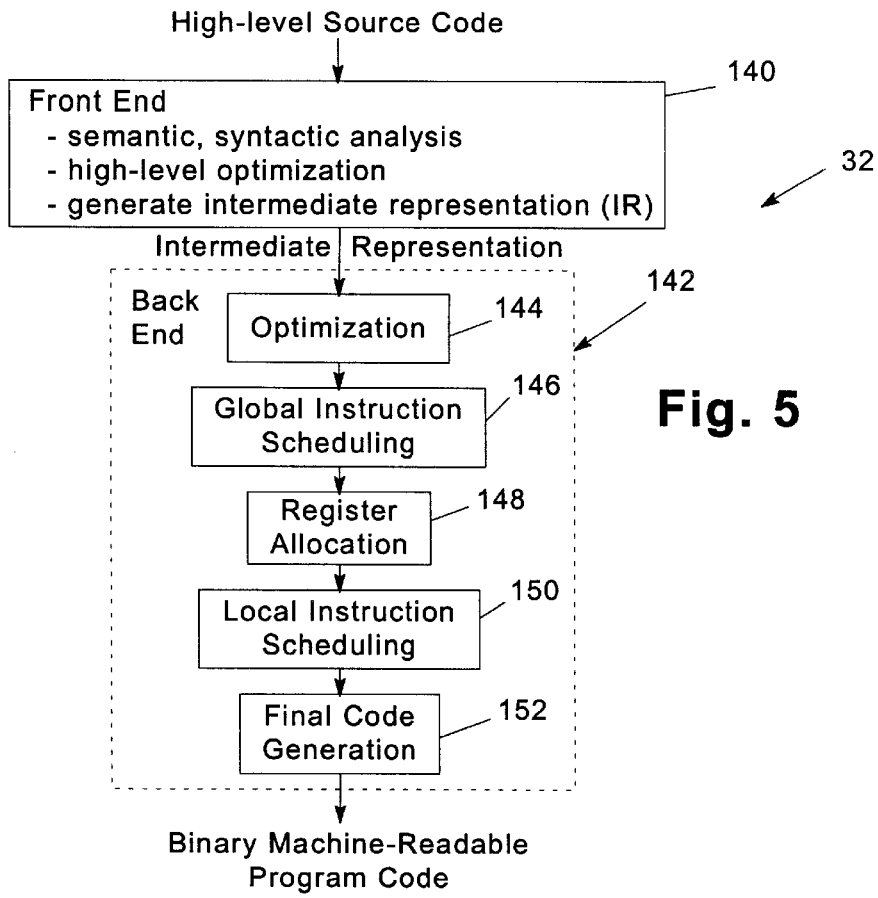
FIG. 5 is a block diagram of the compiler computer program of FIG. 1.

The implementation described in FIGS. 2–4 represents a dynamic system where predicted values are continuously updated with the actual values returned by the L2 cache in response to an L1 data cache miss. In such an implementation, the buffer initially may be clear, with entries for predicted values added during execution. However, as discussed above, the predicted values stored in the data cache miss lookaside buffer may also be generated prior to runtime and loaded into the buffer prior to executing a particular computer program. For example, as illustrated in FIG. 5, a compiler 32 is shown that includes a front end 140 and a back end 142. Front end 140 handles conventional operations such as semantic and syntactic analysis and high-level optimization. In addition, the front end 140 generates an intermediate representation (IR) from the high-level source code of the computer program being compiled.

The back end 142 of compiler 32 performs a number of conventional optimizations, as illustrated at block 144. In addition, global instruction scheduling is performed at block 146, followed by register allocation at block 148, local instruction scheduling at 150 and final code generation at 152, from which a binary machine-readable program code is output.

It is anticipated that the determination of initial or static predicted values may be handled before block 144, after which subsequent optimization phases (e.g., in block 144 and/or others) can exploit those predicted values.

Figure 6:
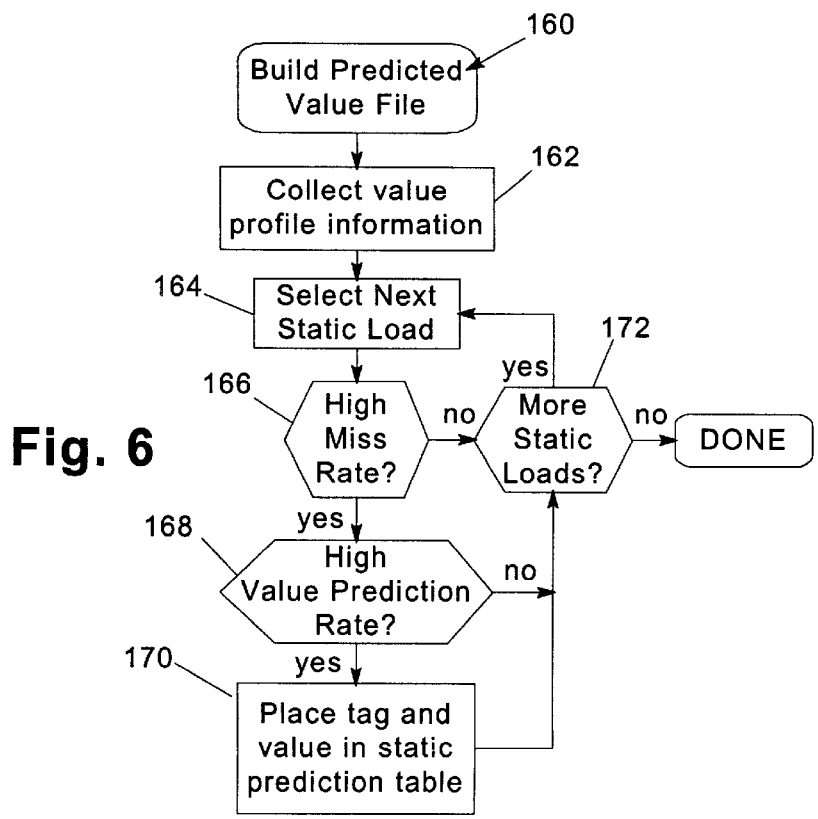
FIG. 6 is a flowchart illustrating the program flow of a build predicted value table routine executed by the compiler computer program of FIG. 5.

As shown in FIG. 6, for example, a build predicted value routine 160 may be executed by compiler 32 to generate a table of predicted values to be loaded into the data cache miss lookaside buffer. Routine 160 begins in block 162 by collecting value profile information about the program being compiled, e.g., via conventional value profiling. As a result of this operation, it is determined for each static load instruction a predicted value, as well as frequency data with respect to the rate of data cache misses for the instruction, as well as the rate in which the value prediction holds true.

Next, in block 164, a loop is initiated to process each static load instruction in the program being compiled. In this block, the next unprocessed static load instruction is selected. Next, block 166 determines whether the profile information indicates a high miss rate, e.g., a miss rate for the instruction that exceeds a predetermined threshold.

If the miss rate is high, control passes to block 168 to determine whether the value prediction rate also exceeds a predetermined threshold (i.e., is high). If so, the instruction is a candidate for value prediction, and control passes to block 170 to add an entry to a static prediction table, including the predicted value and a tag representative of the memory address for the static load instruction. Control then passes to block 172 to determine whether any unprocessed static load instructions need to be processed. If so, control returns to block 164 to process the next instruction. If not, however, routine 160 is complete. The value information in the table can be exploited by later optimization phases.

Returning to blocks 166 and 168, if either the miss rate or the value prediction rate for the static load instruction does not meet the respective thresholds, the instruction is determined to not be a candidate for value prediction. As such, block 170 is bypassed, and control passes directly to block 172. It should be appreciated that, by setting the threshold values for the miss rate and the value prediction rate, the overall reliability needed for an instruction to qualify for placement in the table can be tailored as desired.

Once a static prediction table is created by routine 160, the table may be copied into the data cache miss lookaside buffer in a number of manners. For example, the buffer may be assigned a particular range of memory addresses in the memory address space, whereby the compiler could load the buffer via inserting appropriate store instructions in the computer program so that upon initialization of the computer program the buffer is loaded with initial values. In the alternative, a program loader could be configured to automatically load the table into the buffer when initially loading a compatible computer program for execution. Other manners will be apparent to one of ordinary skill in the art having the benefit of the instant disclosure.

Moreover, during runtime, once the predicted values are stored into the buffer, execution of instructions may proceed in principally the same manner as described above with respect to FIGS. 3 and 4. Furthermore, it may be desirable to update predicted values based upon actual values as described above with respect to FIG. 3. In the alternative, however, it may be desirable to maintain the buffer in a static state, whereby the updating circuitry disposed in control circuit 62 could be omitted. Furthermore, in a static implementation, the confidence level detection and updating circuitry in control circuit 62 may or may not be required.

Through the use of a data cache miss lookaside buffer as described herein, it is anticipated that significantly greater performance can be obtained relative to like-sized buffers used in conventional value prediction implementations. Specifically, by limiting the storage of predicted values to those associated with load instructions that miss the data cache, often the most used and greatest potential latency instructions are predictable, thereby maximizing the utilization efficiency of value prediction for a given size buffer.

Various modifications may be made to the illustrated embodiments without departing from the spirit and scope of the invention. Therefore, the invention lies in the claims hereinafter appended.

What is claimed is:

1. A circuit arrangement, comprising:
   (a) an execution circuit configured to process a load instruction by initiating retrieval of a value requested by the load instruction from a memory having a cache;
   (b) a buffer storing a predicted value for the load instruction; and
   (c) a control circuit, coupled to the execution circuit and the buffer, the control circuit configured to provide the predicted value to the execution circuit when retrieval of the value requested by the load instruction misses the cache;
   wherein the value requested by the load instruction is representative of data to be returned as a result of the load instruction.

2. The circuit arrangement of claim 1, wherein the predicted value is representative of a value retrieved from the memory in response to a previous cache miss for the load instruction.

3. The circuit arrangement of claim 1, wherein the control circuit is further configured to update the predicted value for the load instruction with an actual value retrieved from the memory.

4. The circuit arrangement of claim 1, wherein the buffer includes a plurality of entries, each entry storing a predicted value for one of a plurality of load instructions processed by the execution circuit.

5. The circuit arrangement of claim 4, wherein the execution circuit includes a program counter, and wherein the plurality of entries in the buffer are indexed by the program counter, with one of the entries storing the predicted value for the load instruction and including a tag representative of an address of the load instruction.

6. The circuit arrangement of claim 4, wherein the control circuit is further configured to only store predicted values in the buffer for load instructions that miss the cache.

7. The circuit arrangement of claim 4, wherein the plurality of load instructions are among a plurality of instructions in a computer program, and wherein the control circuit is further configured to initially load a predetermined value into each entry in the buffer, wherein each predetermined value is determined by profiling of the computer program.

8. The circuit arrangement of claim 1, wherein the execution circuit is further configured to process a subsequent instruction that is dependent upon the value requested by the load instruction using the predicted value in the buffer.

9. The circuit arrangement of claim 8, wherein the execution circuit is further configured to speculatively process the subsequent instruction concurrently with retrieval of an actual value for the load instruction from the memory.

10. The circuit arrangement of claim 9, wherein the control circuit is further configured to compare the predicted and actual values for the load instruction to verify the predicted value.

11. The circuit arrangement of claim 10, wherein the control circuit is further configured to provide the predicted value to the execution circuit only when a predetermined confidence criteria has been met.

12. The circuit arrangement of claim 11, wherein the predetermined confidence criteria includes the predicted and actual values for the load instruction matching in excess of a predetermined threshold, and wherein the control circuit is further configured to update a confidence indicator associated with the predicted value based upon whether the predicted and actual values for the load instruction match.

13. The circuit arrangement of claim 10, wherein the execution circuit is further configured to discard a result of the subsequent instruction responsive to the predicted value not matching the actual value for the load instruction.

14. An integrated circuit device comprising the circuit arrangement of claim 1.

15. A data processing system comprising the circuit arrangement of claim 1.

16. A program product, comprising a hardware definition program that defines the circuit arrangement of claim 1; and a signal bearing media bearing the hardware definition program.

17. The program product of claim 16, wherein the signal bearing media includes at least one of a transmission type media and a recordable media.

18. A method of executing instructions in a computer, the method comprising:
   (a) determining whether a value requested by a load instruction being executed is stored in a cache; and
   (b) in response to determining that the value is not stored in the cache, predicting the value requested by the load instruction;
   wherein the value requested by the load instruction is representative of data to be returned as a result of the load instruction.

19. The method of claim 18, wherein predicting the value requested by the load instruction includes retrieving a predicted value stored in a buffer.

20. The method of claim 19, further comprising speculatively executing a second instruction using the predicted value while an actual value for the load instruction is retrieved from another memory.

21. The method of claim 20, further comprising discarding a result of the second instruction responsive to the predicted value not matching the actual value for the load instruction.

22. The method of claim 19, further comprising updating the predicted value for the load instruction using an actual value retrieved from the memory.

23. The method of claim 22, wherein retrieving the predicted value is only performed when the load instruction misses the cache.

24. The method of claim 22, wherein retrieving the predicted value is only performed after the predicted value is correctly predicted in excess of a predetermined threshold.

25. A method of executing instructions in a computer, the method comprising:
   (a) storing a value requested by a load instruction in a buffer in response to a cache miss for the value, wherein the value represents a predicted value for a subsequent execution of the load instruction; and
   (b) retrieving the value from the buffer during a subsequent execution of the load instruction;
   wherein the value requested by the load instruction is representative of data to be returned as a result of the load instruction.

* * * * *